(12) United States Patent
Bresous et al.

(10) Patent No.: US 9,887,017 B2
(45) Date of Patent: Feb. 6, 2018

(54) NUCLEAR FACILITY COMPRISING AN ANCHOR DEVICE

(71) Applicant: AREVA NP, Courbevoie (FR)

(72) Inventors: Luc Bresous, Bussieres (FR); Serge Roillet, Lyonh (FR)

(73) Assignee: AREVA NP, Courbevoie (FR)

( * ) Notice: Subject to any disclaimer, the term of this patent is extended or adjusted under 35 U.S.C. 154(b) by 297 days.

(21) Appl. No.: 14/651,933

(22) PCT Filed: Dec. 23, 2013

(86) PCT No.: PCT/EP2013/077945
§ 371 (c)(1),
(2) Date: Jun. 12, 2015

(87) PCT Pub. No.: WO2014/102255
PCT Pub. Date: Jul. 3, 2014

(65) Prior Publication Data
US 2015/0348657 A1  Dec. 3, 2015

(30) Foreign Application Priority Data

Dec. 26, 2012 (FR) ...................... 12 62800

(51) Int. Cl.
*G21C 19/07* (2006.01)
*G21C 19/19* (2006.01)
*F16B 5/02* (2006.01)
*F16B 5/07* (2006.01)

(52) U.S. Cl.
CPC ............. *G21C 19/07* (2013.01); *G21C 19/19* (2013.01); *F16B 5/0291* (2013.01); *F16B 5/07* (2013.01)

(58) Field of Classification Search
CPC ........ G21C 19/07; G21C 19/19; F16B 5/0291; F16B 5/07
USPC ........................................ 376/260, 264, 272
See application file for complete search history.

(56) References Cited

U.S. PATENT DOCUMENTS

| 4,019,298 A | 4/1977 | Johnson |
| 5,244,300 A | 9/1993 | Perreira et al. |
| 6,343,107 B1 | 1/2002 | Erbes et al. |
| 2007/0154257 A1 | 7/2007 | Guttormsen |
| 2012/0128114 A1 | 5/2012 | Iwasaki et al. |

FOREIGN PATENT DOCUMENTS

FR  2 684 481 A1  6/1993

OTHER PUBLICATIONS

Search Report for corresponding International Application PCT/EP2013/077495.

*Primary Examiner* — Jack W Keith
*Assistant Examiner* — Daniel Wasil
(74) *Attorney, Agent, or Firm* — Davidson, Davidson & Kappel, LLC

(57) ABSTRACT

A nuclear facility comprising an anchor device is provided. This anchor device comprises a female part and a male part. The female part includes a groove extending along a longitudinal axis. The groove has a width which decreases longitudinally and a transverse section. The male part includes a slider with a shape mating that of the groove and is able to be longitudinally inserted into the groove. The transverse section of the groove is configured so as to prevent the extraction of the slider out of the groove transversely to the longitudinal axis. The anchor device includes a locking device able to prevent the slider from longitudinally sliding out of the groove.

10 Claims, 6 Drawing Sheets

NUCLEAR FACILITY COMPRISING AN ANCHOR DEVICE

The present invention relates to an anchor device, which for example may be used for hanging a tool or a cell for receiving a nuclear fuel assembly in a nuclear facility, in particular in a pool of a nuclear power plant.

BACKGROUND

A nuclear power plant generally comprises a nuclear reactor building inside which is found a nuclear reactor immersed in a pool filled with water and inter alia consisting of a vessel containing a core consisting of a plurality of fuel assemblies positioned side by side inside the vessel, and at least one building called a fuel building, adjoining the nuclear reactor building and generally containing at least one pool for storing the used fuel which may be put into communication with the pool of the nuclear reactor. The water ensures protection against radiations.

The operations for examining and, if required, repairing fuel assemblies, for preparing the loading of the reactor with new or partly irradiated fuel assemblies and possibly repaired fuel assemblies, and the operations for removing used fuel assemblies are generally carried out under water in the pool of the fuel building.

In order to achieve these loading, maintenance and removal operations, it is desirable to be able to store or manipulate tools or nuclear fuel assemblies in the pool, and to have for this, one or several anchor devices under water.

FR 2 684 481 discloses a tool holder comprising grooves with decreasing width and with a dovetail profile for receiving tenons of a mating shape provided on tools intended to be hooked up on the support.

Nevertheless, this tool holder has a risk of unhooking under particular conditions, for example in the case of an earthquake which may have a significant magnitude, at least in certain implantation areas of nuclear power plants.

SUMMARY OF THE INVENTION

One of the objects of the invention is to provide a simple to use and reliable anchor device.

For this purpose, an anchor device is provided comprising a female part and a male part, the female part comprising a groove extending along a longitudinal axis, the groove having a width which decreases longitudinally and a transverse section, the male part comprising a slider of a shape mating that of the groove and able to be inserted longitudinally into the groove, the transverse section of the groove being configured so as to prevent extraction of the slider out of the groove transversely to the longitudinal axis, and a locking device able to prevent the slider from sliding longitudinally out of the groove.

According to other embodiments, the anchor device comprises one or more of the following features, taken individually or according to all the technically possible combinations:

- the transverse section of the groove has at least one dovetail;
- the locking device comprises at least one locking screw;
- at least one locking screw is rotatably mounted on one of the female part or of the male part, the other one of the female part and of the male part comprising a tapped hole for receiving the locking screw;
- at least one locking screw is mounted so as to be captive on one of the female part or of the male part;
- the male part comprises a lumen extending through the male part through the slider so as to define an internal edge for attachment of the male part through the slider;
- the locking device comprises a locking portion added to and attached on the male part, the locking device being provided for retaining the female part on the locking portion;
- the locking portion is attached on the male part by means of at least one key;
- it comprises a guiding device for guiding the slider during longitudinal sliding in the groove before the slider is engaged with the side walls of the groove;
- the guiding device comprises a guiding protrusion on one of the female part and of the male part and a guiding orifice on the other one of the female part and of the male part, the guiding orifice receiving the guiding protrusion during longitudinal sliding upon inserting the slider into the groove.

The invention also provides a nuclear facility, comprising a pool filled with water and at least one anchor device as defined above, one of the male part and of the female part being attached on an internal wall of the pool.

BRIEF SUMMARY OF THE DRAWINGS

The invention and its advantages will be better understood upon reading the description which follows, only given as an example and made with reference to the appended drawings, wherein.

DETAILED DESCRIPTION

Figure 1:
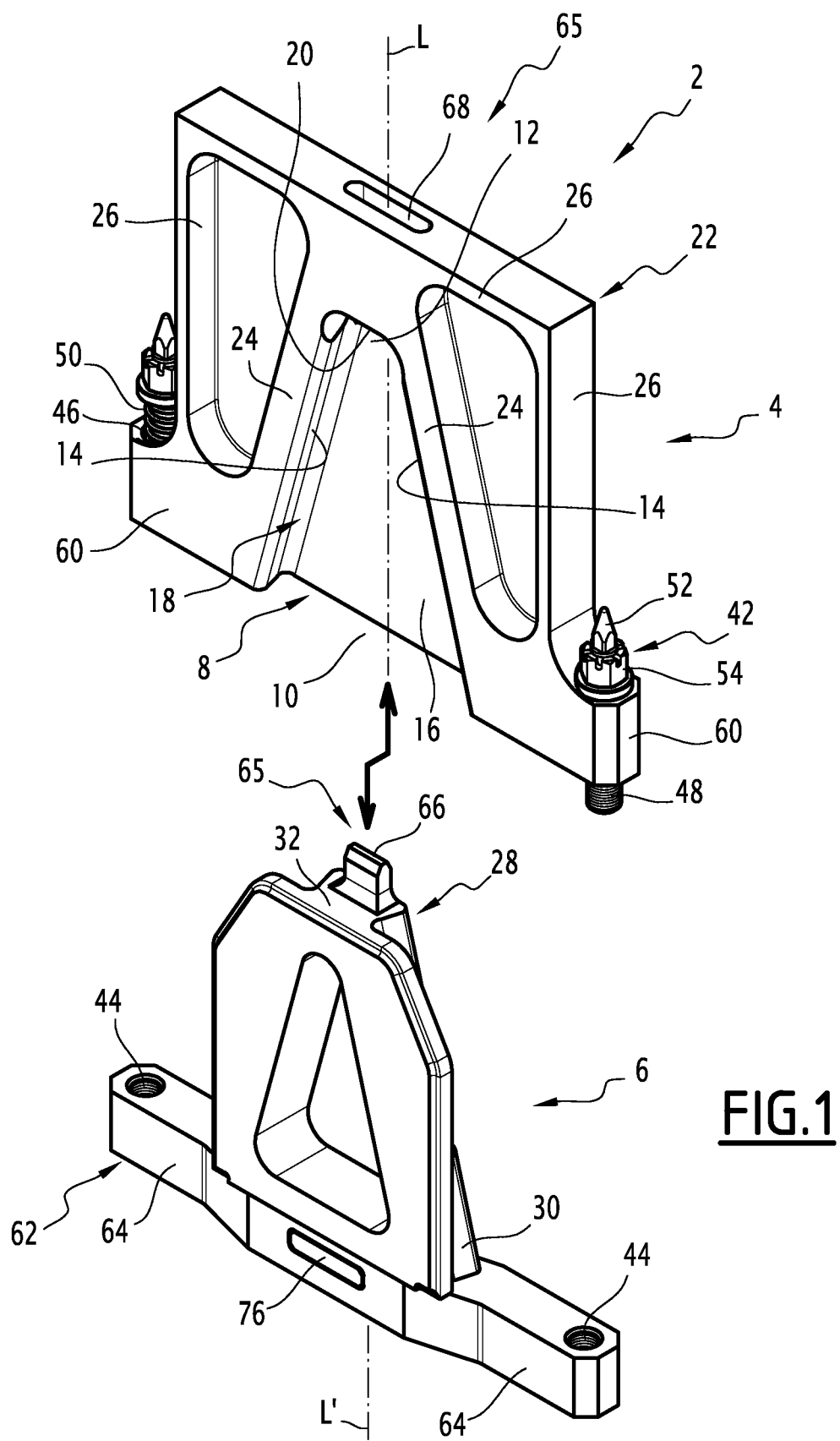
FIG. 1 is a perspective view of an anchor device according to an embodiment of the invention comprising a male part and a female part, before anchoring them.

The anchor device 2 illustrated in FIG. 1 comprises a female part 4 and a male part 6 mating each other configured so as to fit into each other along a longitudinal axis L so as to be anchored mutually.

The female part 4 and the male part 6 are intended to be each attached on a respective element so as to be able to anchor both elements with each other by means of the anchor device 2.

The female part 4 comprises a groove 8 extending along the longitudinal axis L between a first groove end 10 and a second groove end 12. The groove 8 has a width which decreases longitudinally from the first groove end 10 to the second groove end 12. The first groove end 10 is wider than the second groove end 12.

The groove 8 is delimited laterally by two side walls 14 facing each other. The side walls 14 extend along the longitudinal axis L, while converging towards each other from the first groove end 10 to the second groove end 12.

Each side wall 14 extends along a respective direction tilted relatively to the longitudinal axis L. The angle α formed between the respective directions of both side walls 14 is comprised between 8° and 60°.

The groove 8 is delimited by a bottom 16. The bottom 16 extends transversely between the base of the side walls 14.

The groove 8 opens out perpendicularly to the longitudinal axis L through a longitudinal aperture 18. The longitudinal aperture 18 is delimited between free edges of the side walls 14. Each side wall 14 extends between the bottom 16 and the longitudinal aperture 18.

The longitudinal aperture 18 has in a front view (FIG. 3) an isosceles trapezoidal contour, both opposite sides of which, tilted relatively to each other are defined by the side walls 14.

The first groove end 10 opens out. The second groove end 12 is closed by an end wall 20. Alternatively, the second groove end 12 opens out.

Figure 3:
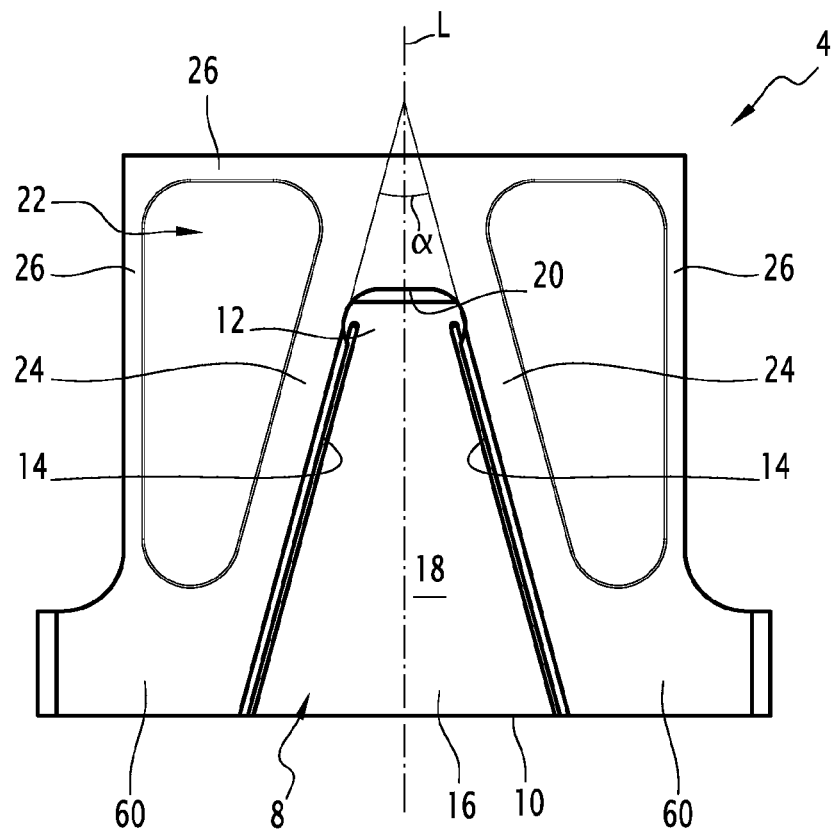
FIG. 3 is a front view of the female part of the anchor device of FIG. 1, attached on a surface.
Figure 4:
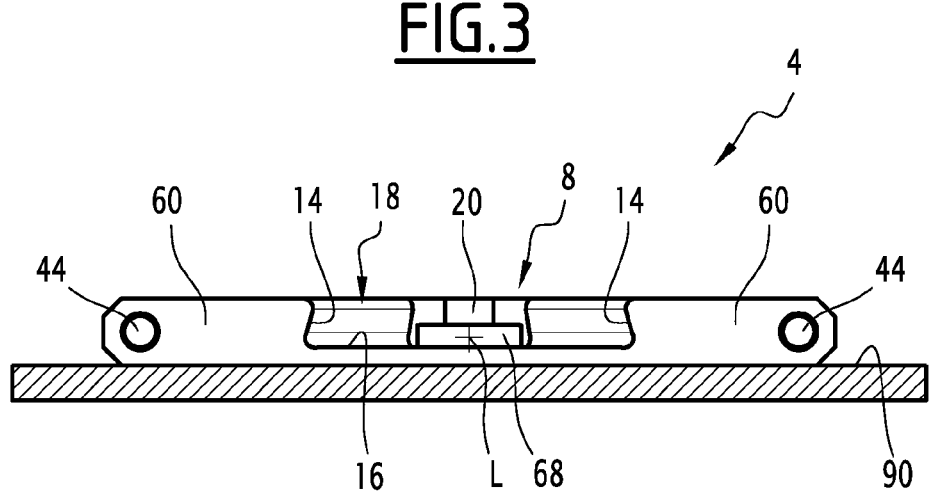
FIG. 4 is a bottom view of the female part of FIG. 3.

As illustrated in FIG. 4 which is a bottom view of the female part 4 of FIG. 3, the groove 8 has a transverse section as a dovetail.

The groove 8 is narrower than its longitudinal aperture 18 and wider at its base in proximity to the bottom 16. The side walls 14 converge towards each other in the direction of the longitudinal aperture 18. The side walls 14 delimit here a substantially isosceles trapezoidal profile.

In the illustrated example, the female part 4 comprises a plate 22 provided on at least one face with ribs delimiting between them cavities (FIG. 3).

The groove 8 is delimited between two anchor ribs 24 tilted relatively to each other, forming here a "V".

Each anchor rib 24 delimits a respective side wall 14, which is formed by one face of the anchoring rib 24 turned towards the other anchoring rib 24.

The bottom 16 is formed by the region of the plate 22 transversely extending between the anchor ribs 24.

The plate 22 is provided with peripheral ribs 26 extending along the edges of the plate 22.

The plate 22 comprises a transverse peripheral rib 26 extending perpendicularly to the longitudinal axis L and two longitudinal peripheral ribs 26 extending along the longitudinal axis L, each from a respective end of the transverse peripheral rib 26. Each anchoring rib 24 extends obliquely between the end of a respective longitudinal peripheral rib 26 and a central segment of the transverse peripheral rib 26. The anchoring ribs 24 converge and join up with a peripheral rib 26 closing the second groove end 12 of the groove 8.

Figure 5:
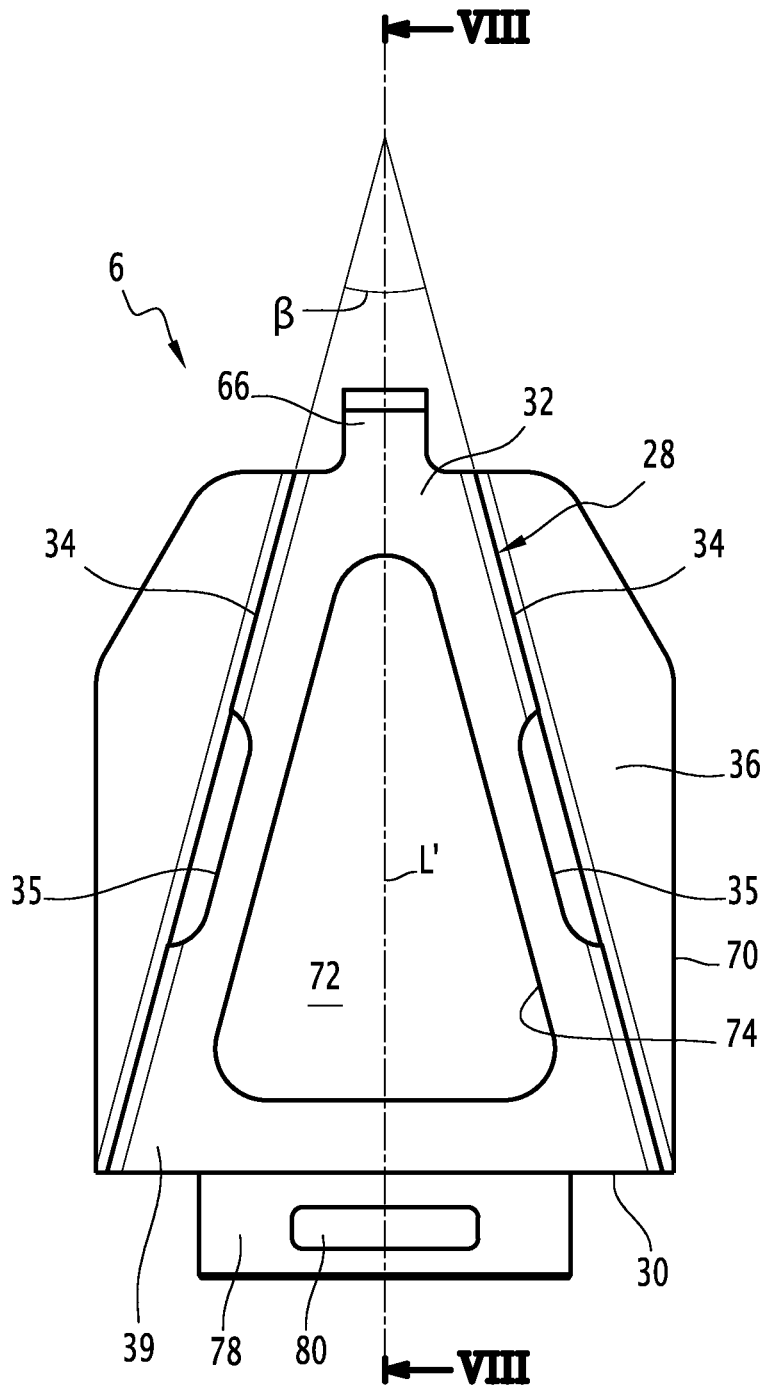
FIG. 5 is a front view of the male part of the anchor device of FIG. 1.

As illustrated in FIG. 5, the male part 6 comprises a slider 28 configured so as to be accommodated in the groove 8. The slider 28 has a shape mating that of the groove 8. The slider 28 inserted into the groove 8 gives the possibility of anchoring together the male part 6 and the female part 4.

The slider 28 extends along the slider axis L' between a first slider end 30 and a second slider end 32 while becoming tapered. The first slider end 30 is wider than the second slider end 32.

The slider 28 has two opposite side faces 34 laterally delimiting the slider 28. The side faces 34 extend between the first slider end 30 and the second slider end 32. The side faces 34 converge towards each other from the first slider end 30 to the second slider end 32.

The slider 28 has in a front view (FIG. 5) an isosceles trapezoidal contour, for which the opposite sides tilted with respect to each other are defined by the side faces 34. The side faces 34 extend along respective directions forming between them an angle θ substantially equal to the angle α between the extension directions of the side walls 14.

Each side face 34 is provided, in its middle portion between the first slider end 30 and the second slider end 32, with a recess 35.

Figure 6:
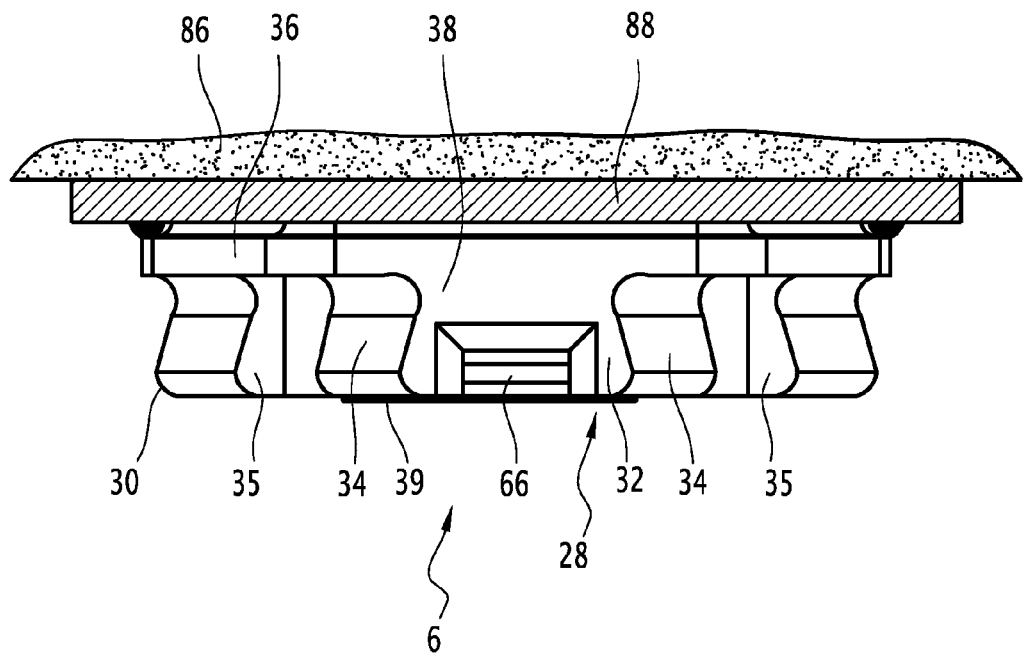
FIG. 6 is a top view of the male part of FIG. 5 attached on a support.

As visible in FIG. 6, which is a top view of the slider 28 of FIG. 5, the slider 28 has a transverse section as a dovetail mating that of the groove 8. The side faces 34 are tilted relatively to each other.

The male part 6 comprises a base 36 rigidly secured to the slider 28. The base 36 is preferably made with the slider 28 in the same material. The slider 28 is narrower at its origin 38 adjacent to the base 36 than a front face 39 opposite to the base 36.

The base 36 has the shape of a plate. As seen from the front (FIG. 5), the base 36 juts out transversely relatively to the slider 28.

The groove 8 is able to be engaged onto the slider 28 by relatively sliding along the longitudinal axis L, from the first groove end 10 to the second groove end 12.

The groove 8 is able to be engaged onto the slider 28 after alignment of the slider axis L' with the longitudinal axis L along which extends the groove 8.

When the slider axis L' is aligned with the longitudinal axis L, because of the mating convergent shapes of the groove 8 and of the slider 28, under the effect of a force tending to displace the slider 28 relatively to the groove 8 along the longitudinal axis L towards the second groove end 12, the slider 28 received in the groove 8 will abut in the latter. Further, the slider axis L' and the longitudinal axis L of the groove 8 will align together.

The slider 28 will abut in the groove 8 along the longitudinal axis L by contact of its side faces 34 with the side walls 14 of the groove 8 and possibly by contact of its second slider end 32 with the end wall 20 closing the second groove end 12.

Figure 7:
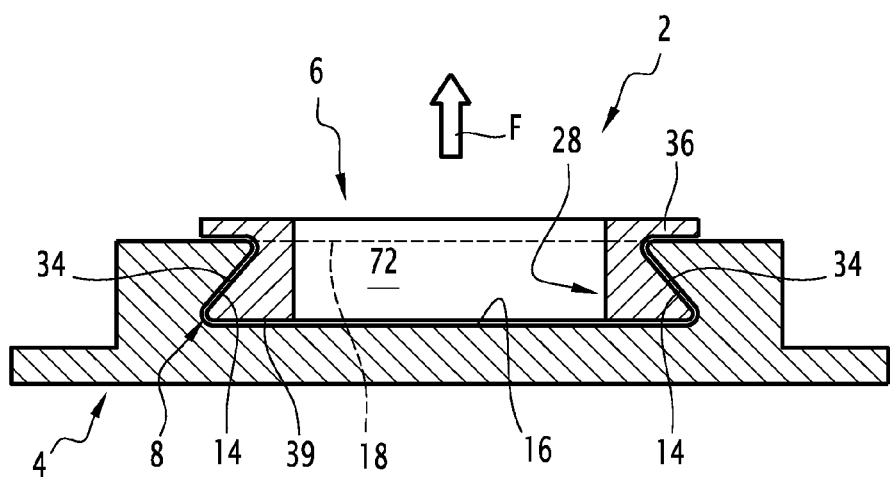
FIG. 7 is a transverse sectional view of the anchor device along VII-VII in FIG. 2.

Further, as illustrated in FIG. 7, when the slider 28 will abut in the groove 8, the mating transverse sections of the groove 8 and of the slider 28 prevent extraction of the slider 28 out of the groove 8 transversely to the longitudinal axis L, in particular through the longitudinal aperture 18 along the arrow F.

The slider 28 and the groove 8 engaged into each other only allow sliding of the male part 6 with respect to the female part 4 along the longitudinal axis L, from the second groove end 12 to the first groove end 10.

The recesses 35 give the possibility of reducing the machining length and the span of the surfaces facing each other. The values of the angles α and β are greater than those of a morse taper so as to prevent the side faces 34 and the side walls 14 applied against each other from adhering together.

Referring back to FIGS. 1 and 2, the anchor device 2 comprises a locking device 40 able to prevent the slider 28 from sliding along the longitudinal axis L out of the groove 8, from the second groove end 12 to the first groove end 10.

The locking device 40 comprises for this purpose additional locking members provided on the female part 4 and the male part 6 and able to cooperate in order to prevent translation along the longitudinal axis L of the male part 6 relatively to the female part 4 tending to extract the slider 28 from the groove 8.

The locking members for example comprise at least one locking screw 42, provided on one of the female part 4 and of the male part 6, each locking screw 42 being configured so as to be screwed into a tapped mating hole 44 (FIG. 1) provided on the other one of the female part 4 and of the male part 6.

Each locking screw 42 is mounted so as to be captive and rotary on that of the female part 4 and of the male part 6 on which it is mounted.

Each locking screw 42 is mounted captive in a receiving orifice 46 in which the locking screw 42 is slidably received between an active position in which the thread 48 of the locking screw 42 protrudes from the receiving orifice 46 for its screwing into a tapped hole 44 for receiving the locking screw 42 (on the right in FIG. 1), and a rest position in which the thread 48 of the locking screw 42 is retracted in the receiving orifice 46 (on the left in FIG. 1).

Each locking screw 42 is returned into a rest position by a return member 50 and slides in the associated receiving orifice 46 towards the active position against the return member 50.

In the illustrated example, two locking screws 42 are mounted so as to be captive and rotary on the female part 4, and the male part 6 is provided with two tapped holes 44, each provided for screwing a respective locking screw 42. The receiving orifices 46 are made in the female part 4.

Each locking screw 42 comprises a rod 52 bearing the threading 48 at a first end and a screw head 54 added and attached on a second end. This gives the possibility of inserting the rod 52 into the receiving orifice 46 by beginning with its second end, and then adding the screw head 54 for the captive mounting of the locking screw 42, axially retained in the receiving orifice 46 in one direction by the threading 48 and in the other direction by the screw head 54.

The female part 4 comprises two protrusions 60 extending on either side of the first groove end 10 protruding laterally outwards. Each protrusion 60 is provided with a receiving orifice 46 which receives a respective locking screw 42.

The locking device 40 comprises a locking portion 62 attached on the male part 6 to the first slider end 30 and which comprises two side extensions 64 extending laterally outwards on either side of the first slider end 30. Each extension 64 being provided with a tapped hole 44.

The locking screw 40 is able to be locked when the slider 28 is engaged and in abutment longitudinally in the groove 8.

When the slider 28 is engaged and in abutment longitudinally in the groove 8, each locking screw 42 is aligned with the corresponding tapped hole 44 so as to be able to be screwed into the latter. The locking device 40 is here locked by screws 42.

Figure 2:
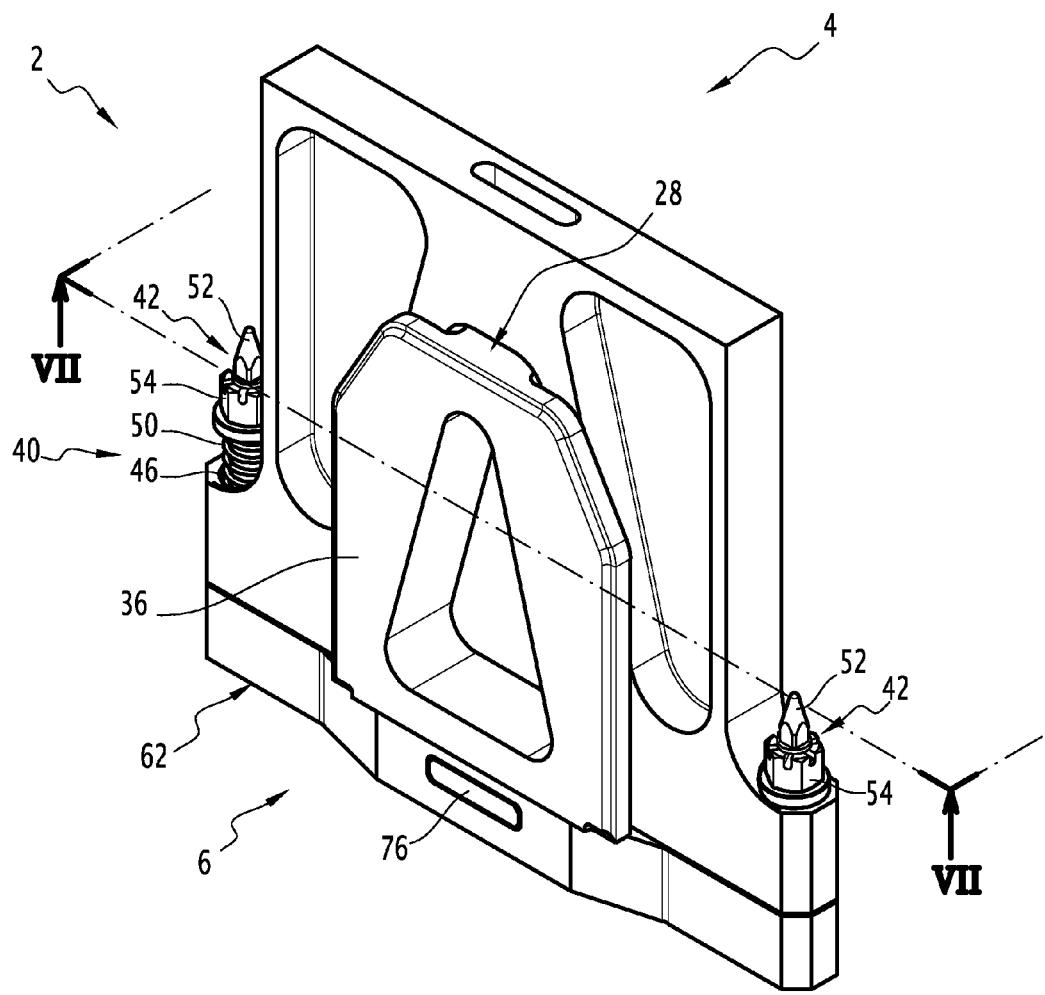
FIG. 2 is a perspective view of the anchor device of FIG. 1 after anchoring.

Once the locking screws 42 are screwed in, the slider 28 is prevented from sliding longitudinally out of the groove 8. The result of this is that the female part 4 and the male part 6 are maintained firmly anchored with each other (FIG. 2).

Thus, when it is locked, the locking device 40 prevents the slider 28 from longitudinally sliding out of the groove 8.

In order to allow separation of the female part 4 and of the male part 6, it is necessary to unlock beforehand the locking device 40, here by unscrewing the locking screw 42.

When it is unscrewed, the locking device 40 allows sliding of the slider 28 longitudinally out of the groove 8.

The anchor device 2 comprises a guiding device 65 configured for guiding the female part 4 and the male part 6 while sliding along the longitudinal axis L relatively to each other before the slider 28 is engaged with the side walls 14 of the groove 8.

The guiding device 65 comprises a guiding protrusion 66 and a guiding orifice 68 configured for slidably receiving the guiding protrusion 66 along the longitudinal axis L upon inserting the slider 28 into the groove 8.

The guiding protrusion 66 is here provided on the male part 6 and extends along the slider axis L', and the guiding orifice 68 is here provided on the female part 4 and extends along the longitudinal axis L. Alternatively, the guiding protrusion 66 is provided on the female part 4 and the guiding orifice 68 is provided on the male part 6.

The guiding protrusion 66 protrudes from the second slider end 32 and the guiding orifice 68 is made at the second groove end 12 of the groove 8, in the end wall 20.

The guiding protrusion 66 is configured so as to begin to be inserted into the guiding orifice 68 before the side faces 34 of the slider 28 are engaged with the side walls 14 of the groove 8 upon inserting the slider 28 into the groove 8.

The guiding protrusion 66 is configured so as to completely clear the guiding orifice 68 after the side faces 34 of the slider 28 are disengaged from the side walls 14 of the groove 8 upon extracting the slider 28 out of the groove 8.

Because of the convergent shape of the groove 8 and of the slider 28, when the slider 28 is in abutment in the groove 8, by sliding the slider 28 along the longitudinal axis L in the groove 8 in the direction of the extraction with an amplitude smaller than the length of the groove 8, it is nevertheless possible to disengage the side faces 34 from the side walls 14 and to extract the slider 28 transversely along the arrow F of FIG. 7 through the longitudinal aperture 18 of the groove 8.

The guiding device 65 gives the possibility of increasing the required longitudinal travel in order to allow such an extraction. Such sliding may for example result from vibrations between the female part 4 and the male part 6 like those caused by an earthquake.

The female part 4 and the male part 6 are provided so as to be each attached on a respective element so as to allow the anchoring together of said elements.

The female part 4 is welded or screwed on the associated element and the male part 6 is welded or screwed on the associated element.

As visible in FIG. 5, in an embodiment, the male part 6 is for example welded on the associated element, by welding an external edge 70 of the male part 6 on said associated element by means of an external weld. The external edge 70 is here the peripheral edge of the base 36 of the male part 6.

The male part 6 comprises a lumen 72 extending through the male part 6 perpendicularly to the longitudinal axis L, through the slider 28. As seen from the front (FIG. 5), the lumen 72 preferably has an internal contour with an isosceles or triangular trapezoidal shape which follows the external contour of the slider 28. The lumen 72 defines an internal edge 74 allowing attachment of the male part 6 on the associated element by welding of the internal edge 74 by means of an internal weld.

The attachment of the male part 6 by means of an external weld and of an internal weld gives the possibility of improving the attachment and in particular allows better resistance to stresses of any direction caused by an earthquake.

Each weld is achieved along the corresponding edge for example as a continuous or discontinuous weld seam. Each weld is for example produced by TIG or MIG welding.

Figure 8:
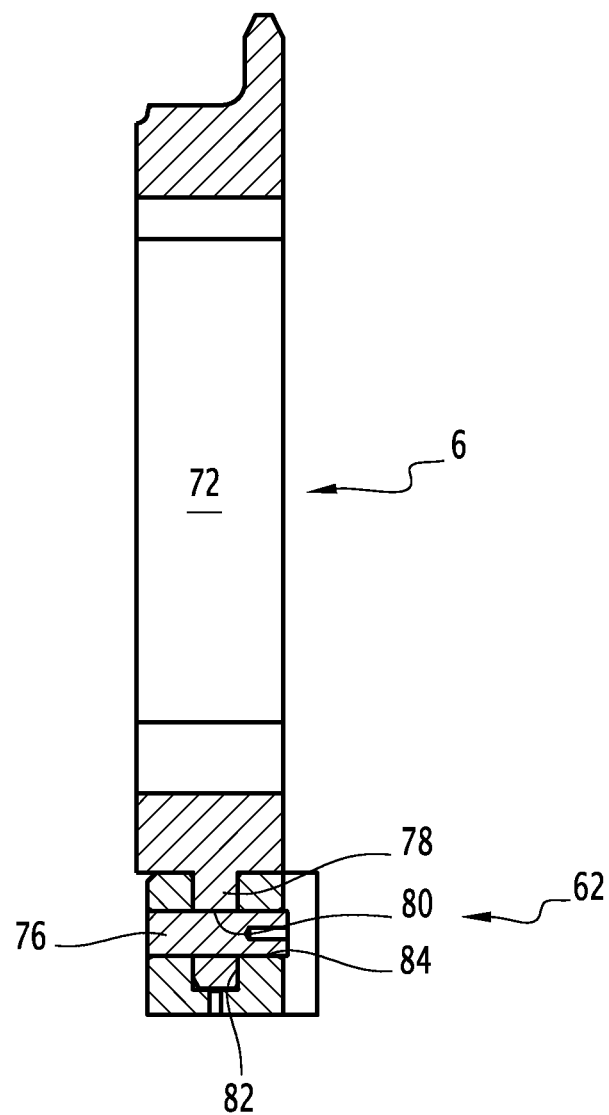
FIG. 8 is a sectional view of the male part along VIII-VIII in FIG. 5.

As visible in FIG. 8, the locking portion 62 is added and attached removably on the male part 6.

In the illustrated example, the attachment is achieved via a key 76 inserted through keying orifices 80, 84 made in the male part 6 and the locking portion 62.

The male part 6 comprises a tenon 78 through which is made a keying orifice 80. The locking portion 62 comprises a mortise 82 for receiving the tenon 78 and a keying orifice 84 intersecting the mortise 82. The locking portion 62 is attached on the male part 6 by inserting the tenon 78 into the mortise 82, so that the keying orifices 80, 84 are aligned, and then by inserting the key 76 in the keying orifices 80, 84.

Making a locking portion 62 separate from the male part 6 facilitates welding of the male part 6. The removable locking portion 62 may further be replaced in the event of deterioration of the tapped holes 44. Further, it allows adaptation if required of the geometry of the locking portion 62 according to that of the female part 4 intended to be anchored on the male part 6. Attachment with a key is simple and rapid to apply in particular under water.

The anchor device 2 is advantageously used for suspending one element from another. The longitudinal axis L is preferably oriented vertically. In such a case, the slider 28 is maintained longitudinally in abutment in the groove 8 under the effect of gravity.

For example, the male part 6 is attached on a support so as to allow the female part 4 to be suspended on the support by anchoring it to the male part 6. The male part 6 is attached on the support with the longitudinal axis L oriented vertically, the width of the slider 28 decreasing upwards. In this case, the female part 4 is suspended from the male part 4 by engaging the groove 8 onto the slider 28, and the gravity exerts on the female part 6 a force directed vertically downwards causing the groove 8 to bear upon the slider 28 which is in abutment in the groove 8.

Alternatively, the female part 4 is attached on the support so as to allow suspension of the male part 6 on the support by anchoring it to the female part 4. The female part 4 is attached on the support with the longitudinal axis L oriented vertically, the width of the groove 8 decreasing downwards. In this case, the male part 6 is suspended from the female part 4 while inserting the slider 28 into the groove 8, and the gravity exerts on the male part 4 a force directed vertically downwards urging the slider 28 in abutment in the groove 8.

In an embodiment, the anchor device 2 is positioned in a pool of a nuclear facility.

For example, the male part 6 is attached on a metal support 88 anchored in the internal wall 86 of a nuclear reactor pool of a nuclear facility (FIG. 6). The female part 4 is attached on an external surface 90 of a tool or a cell for receiving a nuclear fuel assembly (FIG. 4).

During operation, the operator being on the edge of the pool or on a gateway, the tool or the cell to be anchored, provided with the female part 4 is handled by the operator for example by means of a handling tool anchored to a handling gantry. The operator positioned for female part 4 in proximity to the male part 6 and then transversely displaces the handling tool until the bottom 16 of the female part 4 comes into contact with the front face 39 of the slider 28. The operator then displaces vertically downwards the handling tool until the slider 28 is in abutment in the groove 8. The operator then disconnects the handling tool and then by known means, will lock the locking device 40.

The operation is preferably monitored by control or measurement means, for example with visual control by means of visual control devices such as immersed cameras . . . , measurement of forces, in particular of the abutment of the slider 28 in the groove 8, by a spring balance . . . . The anchor device 2 thus allows the tool or the cell to be suspended on the internal wall 86 of the pool.

Owing to embodiments of the invention, the anchoring and the un-anchoring of a piece of equipment or of an equipment support is simple, in particular when they are remotely carried out and under water like in the case in a pool of a nuclear facility.

The anchor device 2 allows self-centering and relative accurate localization of the elements anchored on each other by means of the anchor device 2.

The anchor device 2 allows simple, reliable and resistant anchoring in particular in the case of an earthquake. The anchor device 2 limits the risks of involuntary jamming and unhooking, for example under the effect of vibrations caused by an earthquake.

What is claimed is:

1. A nuclear facility comprising:
a pool filled with water; and
at least one anchor device, each of the at least one anchor device including a female part and a male part, for each of the at least one anchor device:
one of the male part and the female part being attached onto an internal wall of the pool, the female part including a groove extending along a longitudinal axis, the groove having a width longitudinally decreasing from a first groove end to a second groove end and a transverse section, the groove being laterally delimited by two side walls facing each other, the side walls extending along the longitudinal axis while converging towards each other from the first groove end to the second groove end, the groove opening out perpendicularly to the longitudinal axis through a longitudinal aperture delimited between free edges of the side walls, the male part including a slider with a shape mating that of the groove and able to be longitudinally inserted into the groove, the transverse section of the groove being configured so as to prevent extraction of the slider out of the groove transversely to the longitudinal axis,
each of the at least one anchor device including a locking device able to prevent the slider from longitudinally sliding out of the groove.

2. The nuclear facility as recited in claim 1 wherein for each of the at least one anchor device the transverse section of the groove has at least one dovetail.

3. The nuclear facility as recited in claim 1 wherein for each of the at least one anchor device the locking device includes at least one locking screw.

4. The nuclear facility as recited in claim 3 wherein for each of the at least one anchor device the at least one locking screw is rotatably mounted on one of the female part and of the male part, the other one of the female part and the male part including a tapped hole for receiving the locking screw.

5. The nuclear facility as recited in claim 4 wherein for each of the at least one anchor device the at least one locking screw is mounted so as to be captive on one of the female part and of the male part.

6. The nuclear facility as recited in claim 1 wherein for each of the at least one anchor device the male part includes a lumen extending through the male part through the slider so as to define an internal edge for attachment of the male part through the slider.

7. The nuclear facility as recited in claim 1 wherein for each of the at least one anchor device the locking device includes a locking portion added to and attached onto the male part, the locking device being provided for retaining the female part on the locking portion.

8. The nuclear facility as recited in claim 7 wherein for each of the at least one anchor device the locking portion is attached onto the male part by at least one key.

9. The nuclear facility as recited in claim 1 wherein each of the the at least one anchor device includes a guiding device for guiding the slider when longitudinally sliding in the groove before the slider is engaged with the side walls of the groove.

10. The nuclear facility as recited in claim 9 wherein for each of the at least one anchor device the guiding device includes a guiding protrusion on the one of the female part and of the male part and a guiding orifice on the other one of the female part and of the male part, the guiding orifice receiving the guiding protrusion during longitudinal sliding upon inserting the slider into the groove.

\* \* \* \* \*